(12) United States Patent
Ichikawa et al.

(10) Patent No.: US 9,409,059 B2
(45) Date of Patent: Aug. 9, 2016

(54) GOLF BALL WITH CORE MATERIAL CONTAINING RUBBER AND POLYURETHANE

(71) Applicant: NIKE, Inc., Beaverton, OR (US)

(72) Inventors: Yasushi Ichikawa, Tualatin, OR (US); Thomas J. Kennedy, III, Wilbraham, MA (US)

(73) Assignee: NIKE, Inc., Beaverton, OR (US)

( * ) Notice: Subject to any disclaimer, the term of this patent is extended or adjusted under 35 U.S.C. 154(b) by 0 days.

(21) Appl. No.: 14/401,486

(22) PCT Filed: May 15, 2013

(86) PCT No.: PCT/US2013/041081
§ 371 (c)(1),
(2) Date: Nov. 14, 2014

(87) PCT Pub. No.: WO2013/173419
PCT Pub. Date: Nov. 21, 2013

(65) Prior Publication Data
US 2015/0087442 A1 Mar. 26, 2015

Related U.S. Application Data

(60) Provisional application No. 61/648,361, filed on May 17, 2012.

(51) Int. Cl.

| | |
|---|---|
| A63B 37/00 | (2006.01) |
| A63B 37/02 | (2006.01) |
| C08L 9/00 | (2006.01) |
| C08L 75/04 | (2006.01) |
| C08L 75/14 | (2006.01) |
| C08G 18/48 | (2006.01) |
| C08G 18/66 | (2006.01) |
| C08G 18/69 | (2006.01) |
| C08G 18/76 | (2006.01) |
| C08G 18/32 | (2006.01) |
| A63B 45/00 | (2006.01) |
| C08G 18/12 | (2006.01) |
| C08L 75/00 | (2006.01) |

(52) U.S. Cl.
CPC .......... *A63B 37/006* (2013.01); *A63B 37/0003* (2013.01); *A63B 37/0031* (2013.01); *A63B 37/0033* (2013.01); *A63B 37/0035* (2013.01); *A63B 37/0037* (2013.01); *A63B 37/0039* (2013.01); *A63B 37/0041* (2013.01); *A63B 37/0043* (2013.01); *A63B 37/0045* (2013.01); *A63B 37/0047* (2013.01); *A63B 37/0048* (2013.01); *A63B 37/0049* (2013.01); *A63B 37/0051* (2013.01); *A63B 37/0058* (2013.01); *A63B 37/0059* (2013.01); *A63B 37/0061* (2013.01); *A63B 37/0062* (2013.01); *A63B 37/0063* (2013.01); *A63B 37/0064* (2013.01); *A63B 37/0065* (2013.01); *A63B 37/0066* (2013.01); *A63B 37/0078* (2013.01); *A63B 45/00* (2013.01); *C08G 18/12* (2013.01); *C08G 18/3206* (2013.01); *C08G 18/4854* (2013.01); *C08G 18/6674* (2013.01); *C08G 18/698* (2013.01); *C08G 18/7671* (2013.01); *C08L 9/00* (2013.01); *C08L 75/00* (2013.01); *C08L 75/04* (2013.01); *C08L 75/14* (2013.01); *A63B 37/008* (2013.01); *A63B 37/0076* (2013.01); *A63B 37/0077* (2013.01); *A63B 37/0087* (2013.01); *A63B 37/0091* (2013.01); *A63B 37/0092* (2013.01)

(58) Field of Classification Search
None
See application file for complete search history.

(56) References Cited

U.S. PATENT DOCUMENTS

| | | | | |
|---|---|---|---|---|
| 4,726,590 | A * | 2/1988 | Molitor | A63B 37/02 |
| | | | | 473/372 |
| 6,203,450 | B1 | 3/2001 | Bradley et al. | |
| 6,887,168 | B2 * | 5/2005 | Hayashi | A63B 37/06 |
| | | | | 473/377 |
| 6,960,629 | B2 | 11/2005 | Voorheis et al. | |
| 7,014,572 | B2 | 3/2006 | Simonutti et al. | |
| 8,177,665 | B2 | 5/2012 | Loper et al. | |
| 2004/0097653 | A1 * | 5/2004 | Kim | C08G 18/86 |
| | | | | 525/130 |
| 2005/0009640 | A1 * | 1/2005 | Isogawa | A63B 37/0003 |
| | | | | 473/371 |
| 2005/0255942 | A1 * | 11/2005 | Mayer, Jr. | A63B 37/0003 |
| | | | | 473/371 |
| 2005/0261424 | A1 | 11/2005 | Snell et al. | |
| 2010/0167844 | A1 | 7/2010 | Sullivan et al. | |
| 2013/0116066 | A1 * | 5/2013 | Shinohara | A63B 37/0058 |
| | | | | 473/377 |

FOREIGN PATENT DOCUMENTS

| | | | |
|---|---|---|---|
| EP | 2298421 A1 | | 3/2011 |
| WO | WO 2009/017868 | * | 2/2009 |

OTHER PUBLICATIONS

PCT International Search Report and Written Opinion dated Sep. 6, 2014.
Office Action issued in Japanese patent application No. 2015-512781, mailed Mar. 7, 2016.

\* cited by examiner

*Primary Examiner* — David Buttner
(74) *Attorney, Agent, or Firm* — Honigman Miller Schwartz and Cohn LLP

(57) ABSTRACT

A golf ball has a core, core center, or core layer containing a thermoset elastomer and a polyurethane prepared by combining a thermosetting elastomer and an isocyanate-functional polyurethane, which may be an elastomeric polyurethane, then curing the thermosetting elastomer.

20 Claims, 1 Drawing Sheet

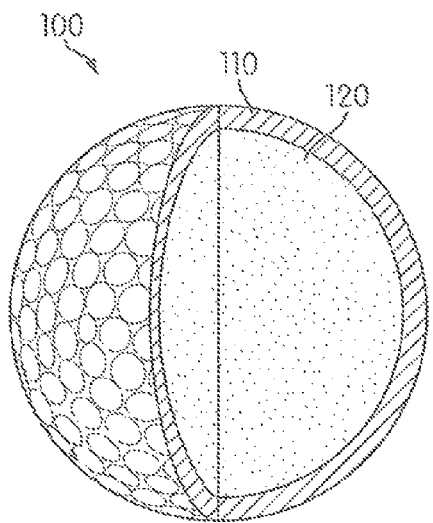
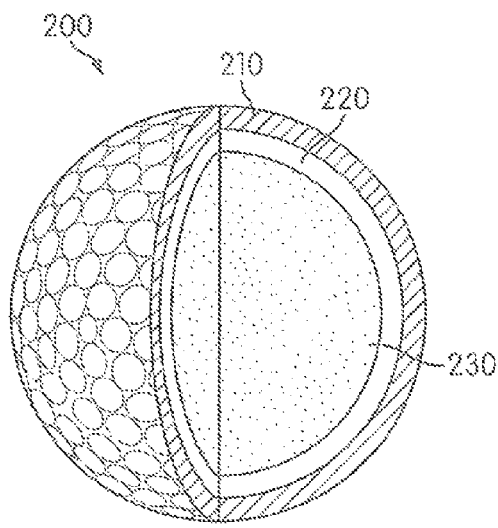
FIG. 1
FIG. 2
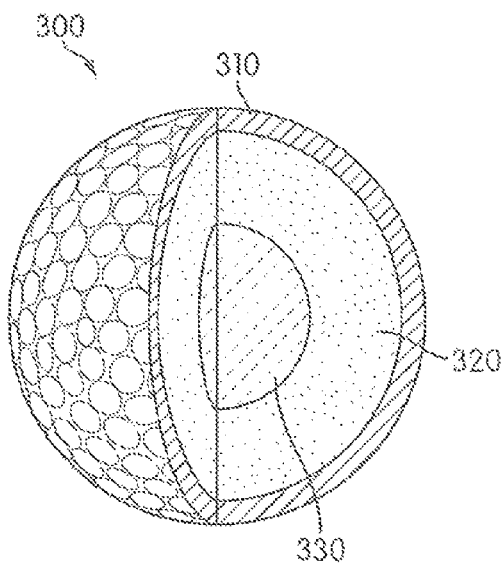
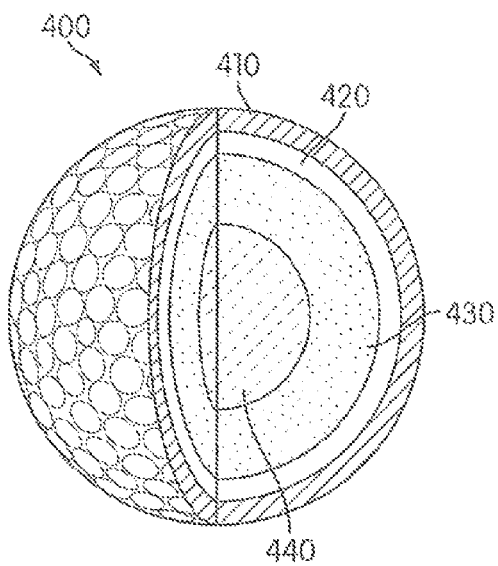
FIG. 3
FIG. 4

GOLF BALL WITH CORE MATERIAL CONTAINING RUBBER AND POLYURETHANE

This application is a 35 USC §371 United States National Phase Application of, and claims priority to, PCT International Application No. PCT/US2013/041081 filed May 15, 2013, which claims the benefit under 35 USC §119 of priority to U.S. Provisional Application Ser. No. 61/648,361 filed May 17, 2012. The entire contents of the aforementioned applications are incorporated herein by reference.

FIELD OF THE INVENTION

The invention concerns golf balls made with thermoset core materials having a high coefficient of restitution (COR).

BACKGROUND

This section provides information helpful in understanding the invention but that is not necessarily prior art.

Modern golf balls are known to have solid cores made from a variety of materials. The material making up a golf ball core may affect the golf ball's performance characteristics in several ways. For example, the selection of the material for use as a golf ball core may affect the golf ball's coefficient of restitution, initial velocity off the tee, feel, durability over time, and other properties.

Suitable known core materials include thermoset materials, such as rubber, styrene butadiene, polybutadiene, isoprene, polyisoprene, and trans-isoprene. Butadiene is a commonly used core material, but water absorption is known to result in loss of distance. A number of patents describe moisture barrier layers in golf balls to prevent this from happening, including Sullivan et al., U.S. Pat. No. 8,303,436 and Hogge et al., U.S. Pat. No. 7,357,733.

Core materials also include thermoplastic materials. For example, Rajagopalan et al. U.S. Pat. No. 6,756,436, entitled "Golf Balls Comprising Highly-Neutralized Acid Polymers," which is incorporated herein by reference, discloses golf balls having highly neutralized acid polymer cores. The highly neutralized polymer may be mixed with a second polymer to change the compression of the core. The second polymer may be ionomeric copolymers and terpolymers, ionomer precursors, thermoplastics, thermoplastic elastomers, polybutadiene rubber, balata, grafted metallocene-catalyzed polymers, non-grafted metallocene-catalyzed polymers, single-site polymers, high-crystalline acid polymers, cationic ionomers, and mixtures of these.

Polyurethane materials have been used in golf balls, for example as described in Michalewich et al, U.S. Pat. Pub. No. 2011/0081492, "Methods of Curing Polyurethane Prepolymers for Golf Balls" and filed on Oct. 5, 2009, incorporated herein by reference, which discloses a golf ball having a cover layer made from a polyurethane pre-polymer. The polyurethane pre-polymer system is formed from a reaction mixture having an isocyanate index of 1.20 or more. The cover is subsequently exposed to moisture in order to effect full curing of an isocyanate-functional prep-polymer. The cover is used over a conventional rubber core to improve the golf ball cover's durability and resistance to tears and cuts.

Molitor, U.S. Pat. No. 4,726,590, entitled "High Coefficient Golf Ball Core" and incorporated herein by reference, discloses one-piece golf ball cores with improved coefficients of restitution. The cores are made of rubbers such as polybutadiene crosslinked with an ethylenically unsaturated metal salt such as zinc mono- or diacrylate or methacrylate and a polyfunctional isocyanate such as 4,4'-diphenylmethane diisocyanate. The polyfunctional isocyanate is said to harden the core, decreasing compression values and increasing COR.

There remains a need in the art for new core material formulations that improve physical properties of the core and the golf ball.

SUMMARY OF THE DISCLOSURE

This section provides a general summary of the disclosure and may not be comprehensive of its full scope or all of the disclosed features.

Disclosed is a golf ball having a core of a unitary core ball or a core center or core layer of a multi-layer ball containing a thermoset elastomer and a polyurethane prepared by combining a thermosetting elastomer and an isocyanate-functional polyurethane, which may be an elastomeric polyurethane, then curing the thermosetting elastomer. In one aspect, the disclosed technology provides a golf ball having a core or core layer containing a thermoset elastomer and an isocyanate-functional thermoplastic polyurethane, which may be an elastomeric polyurethane. The isocyanate groups of the polyurethane react with water vapor that enters the core to prevent degradation of the core, particularly when the thermoset elastomer is a rubber. In another aspect, the isocyanate-functional polyurethane is crosslinked. The thermoplastic polyurethane may be crosslinked through reaction of the isocyanate groups with water, through addition polymerization of pendent ethylenically unsaturated groups, or both. The golf ball may have a cover.

In various embodiments, the isocyanate-functional polyurethane is the reaction product of a reactants having an isocyanate index of at least about 1.05. The isocyanate index of a reaction mixture is a measure of the equivalents of isocyanate used relative to the theoretically stoichiometric equivalents of isocyanate needed to react with the equivalents of polyol or other isocyanate-reactive reactants. As used in this disclosure, an isocyanate index is calculated as the equivalents of isocyanate used divided by the equivalents of isocyanate-reactive reactants. For example, a reaction mixture of equal equivalents of diisocyanate and diol has an isocyanate index of 1.00; a reaction mixture with a 10% excess in equivalents of diisocyanate over the equivalent of diol has an isocyanate index of 1.10.

In various embodiments, the thermoset elastomer is selected from rubbers, silicone rubbers, crosslinked metallocene catalyzed polyolefins, crosslinked polyamide elastomers, and combinations of these.

The disclosed golf ball has improved durability. The polyurethane can add flexibility to the core composition and reacts with any water that may be in a polybutadiene core to improve COR. The reaction with water forms crosslinks in the polyurethane. During the life of the golf ball, the isocyanate-functional polyurethane may scavenge water vapor that could otherwise degrade the core or core layer containing the isocyanate-functional polyurethane. Reaction of the isocyanate groups with the water can crosslink the polyurethane to maintain or increase the resilience of the core COR of the golf ball during its play life.

A "core" is a golf ball center; a golf ball with a multi-layer core includes a core center as an innermost core part and one or more "core layers" surrounding the center. A "core layer" is a structural golf ball layer that has significant effect on the coefficient of restitution (COR) of the ball. A core layer may also sometimes be referred to in the art as a mantle, particularly when it does not contain a rubber. A "cover" or "cover layer" (in the case of a multilayer cover) is the outer structural golf ball layer or one of the outer structural golf ball layers that has significant effect on the spin rate of the ball. Coating layers (whether paint layers or clear coating layers) are not considered to be structural layers.

"Compression deformation" is the deformation amount under a compressive load of 130 kg minus the deformation amount under a compressive load of 10 kg. Hardness is measured according to ASTM D-2240, but measured on the land area of a curved surface of a molded ball. Hardness units are generally given in Shore D unless otherwise indicated. "Coefficient of restitution" or COR is measured generally according to the following procedure: a test object is fired by an air cannon at an initial velocity of 40 m/sec, and a speed monitoring device is located over a distance of 0.6 to 0.9 meters from the cannon. After striking a steel plate positioned about 1.2 meters away from the air cannon, the test object rebounds through the speed-monitoring device. The return velocity divided by the initial velocity is the COR. Flexural modulus is measured in generally accordance with ASTM D-790. Vicat softening temperature is measured generally in accordance with ASTM D-1525.

"A," "an," "the," "at least one," and "one or more" are used interchangeably to indicate that at least one of the item is present; a plurality of such items may be present unless the context clearly indicates otherwise. All numerical values of parameters (e.g., of quantities or conditions) in this specification, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. In addition, disclosure of ranges includes disclosure of all values and further divided ranges within the entire range. Each value within a range and the endpoints of a range are hereby all disclosed as separate embodiment. In this description of the invention, for convenience, "polymer" and "resin" are used interchangeably to encompass resins, oligomers, and polymers. The terms "comprises," "comprising," "including," and "having," are inclusive and therefore specify the presence of stated items, but do not preclude the presence of other items. As used in this specification, the term "or" includes any and all combinations of one or more of the listed items. When the terms first, second, third, etc. are used to differentiate various items from each other, these designations are merely for convenience and do not limit the items.

It should be understood that the description and specific examples are intended for purposes of illustration only and are not intended to limit the scope of the claims.

BRIEF DESCRIPTION OF THE DRAWINGS

The drawings illustrate some aspects of the disclosed technology.

FIG. 1 is a cross-sectional view of a two-piece golf ball;

FIG. 2 is a cross-sectional view of a first example of a multi-layer golf ball;

FIG. 3 is a cross-sectional view of a second example of a multi-layer golf ball; and FIG. 4 is a cross-sectional view of a third example of a multi-layer golf ball.

The parts of the figures are not necessarily to scale.

DETAILED DESCRIPTION

A detailed description of exemplary, nonlimiting embodiments follows.

The golf ball having a core or core layer containing a thermoset elastomer and a polyurethane prepared by combining a thermosetting elastomer and an isocyanate-functional polyurethane, then curing the thermosetting elastomer.

Thermosetting Elastomer

Nonlimiting examples of thermosetting elastomers include rubbers such as natural rubber and synthetic rubbers such as styrene butadiene rubber, polybutadiene rubber, polyisoprene rubber, styrene-butadiene rubber (SBR), ethylenepropylenediene terpolymer (EPDM), and acrylonitrile-butadiene rubber (NBR), chloroprene rubber (CR), isobutylene-isoprene rubber (IIR), styrene isoprene butadiene rubber (SIBR); silicone rubbers; and crosslinkable thermoplastic elastomers, including metallocene catalyzed polyolefins, polyamide elastomers, and combinations of these. Polybutadienes synthesized using a rare-earth catalyst or a Group VIII metal compound catalyst are preferred for greater resiliency. Preferred rare-earth catalysts are lanthanum series rare-earth compounds, particularly neodymium catalysts, to make a polybutadiene rubber having a high cis-1,4 bond content and a low 1,2-vinyl bond content. Where necessary, an organoaluminum compound, an alumoxane, a halogen-bearing compound, and a Lewis base may be used in combination with the lanthanum series rare-earth compound. High cis-polybutadiene (at least 40 mol %, preferably at least 60 mol %, more preferably at least 70% mol %, still more preferably at least 80 mol %, and most preferably at least 90 mol % cis-1,4 bond) is one preferred rubber. In some embodiments, the amount of cis-1,4-polybutadiene may be at least 50 parts by weight, based on 100 parts by weight of the rubber compound. Trans-polybutadiene is another suitable rubber. This polybutadiene isomer may be formed by converting the cis isomer polybutadiene to the trans isomer during a molding cycle by including in the rubber compound a cis-to-trans catalyst.

When the thermosetting elastomer is a rubber, the core or core layer material is compounded with a crosslinker and free-radical initiator for the thermosetting rubber. The crosslinker may be a metal oxide such as zinc oxide or a metal salt of an ethylenically unsaturated acid such as acrylic acid or methacrylic acid. In some embodiments, the cross-linking agent is one or more of zinc diacrylate, zinc dimethacrylate, zinc acrylate, zinc methacrylate, magnesium acrylate, magnesium diacrylate, magnesium methacrylate, or magnesium dimethacrylate. In some embodiments, zinc diacrylate may provide advantageous resilience properties.

Suitable initiators include peroxide compounds such as diacyl peroxides, peroxyesters, dialkyl peroxides, peroxyketals and peroxymonocarbonates. including as specific examples dicumyl peroxide, 1,1-di(t-butylperoxy) 3,3,5-trimethyl cyclohexane, α,α'-bis(t-butylperoxy)diisopropylbenzene, 2,5-dimethyl-2,5 di(t-butylperoxy) hexane, di-t-butyl peroxide, and t-butylperoxy 2-ethylhexyl carbonate, and combinations of such initiators. The amount of free-radical initiator per 100 parts by weight of the base rubber may typically at least about 0.3 part by weight, more preferably at least about 0.5 part by weight, and even more preferably at least about 0.7 part by weight up to about 5.0 parts by weight, more preferably up to about 4.0 parts by weight, even more preferably up to about 3.0 parts by weight, and most preferably up to about 2.0 parts by weight.

When the thermosetting elastomer is a crosslinkable thermoplastic elastomer, the core or core material is compounded with a crosslinker for the thermoplastic elastomer. Amine-functional polyamides may be compounded with polyepoxides such as epoxy resins and, optionally, a suitable catalyst for the amine-epoxide reaction. Elastomeric polyolefins may be crosslinked by free radical initiators, such as t-butyl peroxy initiators, capable of hydrogen abstraction from the polyolefin.

Isocyanate-Functional Polyurethane

The core or core layer also includes a polyurethane provided by including an isocyanate-functional polyurethane in the thermosetting elastomer compound before the thermosetting elastomer is cured. An isocyanate-functional polyurethane is preferably prepared by polymerization of a reaction mixture having an isocyanate index of at least about 1.05, preferably at least about 1.10. Generally, the higher the isocyanate index the more crosslinking may take place to change the physical properties of the material. In various embodiments, the isocyanate index is at least about 1.08, or least about 1.10, or at least about 1.12, or at least about 1.15, or at least about 1.18. In another embodiment, the isocyanate index may be from about 1.05 to about 1.18, or from about 1.05 to 1.15, or from about 1.10 to about 1.18, or from about 1.10 to about 1.15.

During curing of the thermosetting elastomer, the isocyanate groups of the isocyanate-functional polyurethane can react with any small amounts of water present in the elastomer compound to form urea crosslinks. The urea crosslinks may react with further isocyanate groups to form biuret linkages. Isocyanate groups of the polyurethane may remain unreacted to scavenge water that may find its way into the core during use of the ball.

In general terms, suitable isocyanate-functional polyurethanes are reaction products of mixtures of one or more polyisocyanates and one or more polyols having these isocyanate indexes. A thermoplastic polyurethane results when all or substantially all of the reactants are difunctional (while careful addition of limited amounts of a trifunctional reactant may result in a branched thermoplastic polyurethane, optionally using a monofunctional reactant to help control branching). A thermoset polyurethane may be obtained by addition polymerization of ethylenic unsaturation of the polymer during curing of the core or core layer.

The polyisocyanate may be aromatic or aliphatic. Useful diisocyanate compounds used to prepare thermoplastic polyurethanes include, without limitation, isophorone diisocyanate (IPDI), methylene bis-4-cyclohexyl isocyanate ($H_{12}$MDI), cyclohexyl diisocyanate (CHDI), m-tetramethyl xylene diisocyanate (m-TMXDI), p-tetramethyl xylene diisocyanate (p-TMXDI), 4,4'-methylene diphenyl diisocyanate (MDI, also known as 4,4'-diphenylmethane diisocyanate), 2,4- or 2,6-toluene diisocyanate (TDI), ethylene diisocyanate, 1,2-diisocyanatopropane, 1,3-diisocyanatopropane, 1,6-diisocyanatohexane (hexamethylene diisocyanate or HDI), 1,4-butylene diisocyanate, lysine diisocyanate, meta-xylylenediisocyanate and para-xylylenediisocyanate, 4-chloro-1,3-phenylene diisocyanate, 1,5-tetrahydro-naphthalene diisocyanate, 4,4'-dibenzyl diisocyanate, and xylylene diisocyanate (XDI). These may be used in any combination. In certain embodiments MDI may be a preferred diisocyanate. Nonlimiting examples of higher-functionality polyisocyanates that may be used in limited amounts to produce branched thermoplastic polyurethanes (optionally along with monofunctional alcohols) include 1,2,4-benzene triisocyanate, 1,3,6-hexamethylene triisocyanate, 1,6,11-undecane triisocyanate, bicycloheptane triisocyanate, triphenylmethane-4,4',4"-triisocyanate, isocyanurates of diisocyanates, biurets of diisocyanates, and allophanates of diisocyanates.

Nonlimiting examples of suitable diols and polyols that may be used include ethylene glycol and lower oligomers of ethylene glycol including diethylene glycol, triethylene glycol and tetraethylene glycol; propylene glycol and lower oligomers of propylene glycol including dipropylene glycol, tripropylene glycol and tetrapropylene glycol; cyclohexanedimethanol, 1,6-hexanediol, 2-ethyl-1,6-hexanediol, 1,4-butanediol, 1,5-pentanediol, 1,3-propanediol, butylene glycol, neopentyl glycol, dihydroxyalkylated aromatic compounds such as the bis (2-hydroxyethyl) ethers of hydroquinone and resorcinol; p-xylene-α,α'-diol; the bis (2-hydroxyethyl) ether of p-xylene-α,α'-diol; m-xylene-α,α'-diol and combinations of these. Thermoplastic polyurethanes may be made using small amounts of triols or higher functionality polyols, such as trimethylolpropane or pentaerythritol, optionally along with monomeric alcohols such as C2-C8 monools.

In various embodiments, the polyurethane may be a thermoplastic polyurethane elastomer. The thermoplastic polyurethane elastomer may be selected from thermoplastic polyester-polyurethanes, polyether-polyurethanes, and polycarbonate-polyurethanes, including, without limitation, polyurethanes polymerized using as diol reactants polyesters, polycaprolactone polyesters, and polyethers of tetrahydrofuran, ethylene oxide, propylene oxide, and copolymers including ethylene oxide and propylene oxide. These polymeric diol-based polyurethanes are prepared by reaction of the polymeric diol (polyester diol, polyether diol, polycaprolactone diol, polytetrahydrofuran diol, or polycarbonate diol), one or more polyisocyanates such as those already mentioned, and, optionally, one or more chain extension compounds. Chain extension compounds, as the term is used herein, are compounds having two or more functional groups reactive with isocyanate groups, preferably two functional groups reactive with isocyanate groups, such as the diols already mentioned. Preferably the polymeric diol-based polyurethane is linear or substantially linear (i.e., all or substantially all of the reactants are difunctional).

The polyester diols used in forming a thermoplastic polyurethane are in general prepared by the condensation polymerization of one or more polyacid compounds and one or more polyol compounds. Preferably, the polyacid compounds and polyol compounds are di-functional, i.e., diacid compounds and diols are used to prepare linear or substantially linear polyester diols, although minor amounts of mono-functional, tri-functional, and higher functionality materials (perhaps up to 5 mole percent) can be included to provide a slightly branched but uncrosslinked polyester polyol. Suitable dicarboxylic acids include, without limitation, glutaric acid, succinic acid, malonic acid, oxalic acid, phthalic acid, terephthalic acid, isophthalic acid, hexahydrophthalic acid, adipic acid, maleic acid, suberic acid, sebacic acid, their anhydrides and polymerizable esters (e.g., methyl esters) and salts (e.g., chlorides), and combinations of these. Suitable polyols include those already mentioned, especially the diols, and they may be used in any combination. Typical catalysts for the esterification polymerization are protonic acids, Lewis acids, titanium alkoxides, and dialkyltin oxides.

A polymeric polyether or polycaprolactone diol reactant for preparing thermoplastic polyurethanes may be obtained by reacting a diol initiator, e.g., ethylene or propylene glycol, with a lactone or alkylene oxide chain-extension reagent.

Lactones that can be ring opened by an active hydrogen are well-known in the art. Examples of suitable lactones include, without limitation, ε-caprolactone, γ-caprolactone, β-butyrolactone, β-propriolactone, γ-butyrolactone, α-methyl-γ-butyrolactone, β-methyl-γ-butyrolactone, γ-valerolactone, δ-valerolactone, γ-decanolactone, δ-decanolactone, γ-nonanoic lactone, γ-octanoic lactone, and combinations of these. In one preferred embodiment, the lactone is ε-caprolactone. Useful catalysts include those mentioned above for polyester synthesis. Alternatively, the reaction can be initiated by forming a sodium salt of the hydroxyl group on the molecules that will react with the lactone ring.

In other embodiments, a diol initiator may be reacted with an epoxide-containing compound to produce a polyether diol to be used in the polyurethane polymerization. Alkylene oxide polymer segments include, without limitation, the polymerization products of ethylene oxide, propylene oxide, 1,2-cyclohexene oxide, 1-butene oxide, 2-butene oxide, 1-hexene oxide, tert-butylethylene oxide, phenyl glycidyl ether, 1-decene oxide, isobutylene oxide, cyclopentene oxide, 1-pentene oxide, and combinations of these. The oxirane-containing compound is preferably selected from ethylene oxide, propylene oxide, butylene oxide, tetrahydrofuran, and combinations of these. The alkylene oxide polymerization is typically base-catalyzed. The polymerization may be carried out, for example, by charging the hydroxyl-functional initiator compound and a catalytic amount of caustic, such as potassium hydroxide, sodium methoxide, or potassium tert-butoxide, and adding the alkylene oxide at a sufficient rate to keep the monomer available for reaction. Two or more different alkylene oxide monomers may be randomly copolymerized by coincidental addition or polymerized in blocks by sequential addition. Homopolymers or copolymers of ethylene oxide or propylene oxide are preferred. Tetrahydrofuran may be polymerized by a cationic ring-opening reaction using such counterions as $SbF_6^-$, $AsF_6^-$, $PF_6^-$, $SbCl_6^-$, $BF_4^-$, $CF_3SO_3^-$, $FSO_3^-$, and $ClO_4^-$. Initiation is by formation of a tertiary oxonium ion. The polytetrahydrofuran segment can be prepared as a "living polymer" and terminated by reaction with the hydroxyl group of a diol such as any of those mentioned above. Polytetrahydrofuran is also known as polytetramethylene ether glycol (PTMEG). In certain embodiments preferred chain-extension reagents in making a polymeric diol reactant are ε-caprolactone and tetrahydrofuran.

Aliphatic polycarbonate diols that may be used in making a thermoplastic polyurethane elastomer are prepared by the reaction of diols with dialkyl carbonates (such as diethyl carbonate), diphenyl carbonate, or dioxolanones (such as cyclic carbonates having five- and six-member rings) in the presence of catalysts like alkali metal, tin catalysts, or titanium compounds. Useful diols include, without limitation, any of those already mentioned. Aromatic polycarbonates are usually prepared from reaction of bisphenols, e.g., bisphenol A, with phosgene or diphenyl carbonate.

In various embodiments, the polymeric diol preferably has a weight average molecular weight of at least about 500, more preferably at least about 1000, and even more preferably at least about 1800 and a weight average molecular weight of up to about 10,000, but polymeric diols having weight average molecular weights of up to about 5000, especially up to about 4000, may also be preferred. The polymeric diol advantageously has a weight average molecular weight in the range from about 500 to about 10,000, preferably from about 1000 to about 5000, and more preferably from about 1500 to about 4000. The weight average molecular weights may be determined by ASTM D-4274.

The synthesis of the isocyanate-functional polyurethane or elastomeric polyurethane may be carried out by reacting one or more of the above polymeric diols, one or more compounds having at least two isocyanate groups such as the diisocyanates and polyisocyanates already mentioned, and, optionally, one or more diols as chain extension agents in a mixture with an excess of isocyanate equivalents. Other useful active hydrogen-containing chain extension agents that may be used include dithiols, diamines, or compounds having a mixture of hydroxyl, thiol, and amine groups, such as alkanolamines, aminoalkyl mercaptans, and hydroxyalkyl mercaptans, among others. The molecular weight of the chain extenders preferably range from about 60 to about 400. Alcohols and amines are preferred. Examples of useful diols include those diols already mentioned. Suitable diamine extenders include, without limitation, ethylene diamine, diethylene triamine, triethylene tetraamine, and combinations of these. Other typical chain extenders are amino alcohols such as ethanolamine, propanolamine, butanolamine, and combinations of these. The dithiol and diamine reactants may also be included in preparing polyurethanes that are not elastomeric.

The reaction of the polyisocyanate, polymeric diol (if making an elastomeric polyurethane), and polyol or other chain extension agent is typically carried out at an elevated temperature in the presence of a catalyst. Typical catalysts for this reaction include organotin catalysts such as stannous octoate, dibutyl tin dilaurate, dibutyl tin diacetate, dibutyl tin oxide, tertiary amines, zinc salts, and manganese salts. Generally, for elastomeric polyurethanes, the ratio of polymeric diol, such as polyester diol, to extender can be varied within a relatively wide range depending largely on the desired hardness of the final polyurethane elastomer. For example, the equivalent proportion of polyester diol to extender may be within the range of 1:0 to 1:12 and, more preferably, from 1:1 to 1:8. The polymeric diol segments typically are from about 35% to about 65% by weight of the polyurethane polymer, and preferably from about 35% to about 50% by weight of the polyurethane polymer.

The ethylenically unsaturated polyurethane may be made by copolymerizing an unsaturated diol, for example having primary hydroxyl groups, and at least unsaturated group such as an allyl ether group. Nonlimiting examples of such unsaturated diols include low molecular weight hydroxyl-terminated polybutadiene resins of the structure (I)

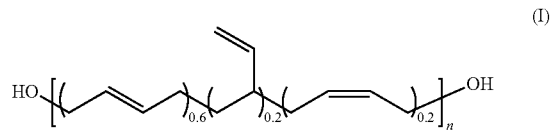

in which n is an integer of from about 5 to about 20, examples of which are sold by Cray Valley USA, LLC, Exton, Pa. and unsaturated diol monomers of the structure (II)

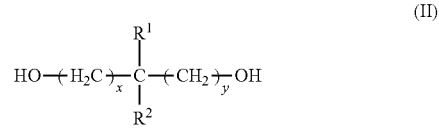

in which $R^1$ may be any suitable substituted or unsubstituted alkyl, substituted or unsubstituted aryl, substituted or unsubstituted alkyl-aryl group, substituted or unsubstituted ether group, substituted or unsubstituted ester group, any combination of the above groups, or H, and may optionally include an unsaturated bond in any main chain or side chain of any group; $R^2$ may be any suitable substituted or unsubstituted alkyl, substituted or unsubstituted aryl, substituted or unsubstituted alkyl-aryl group, substituted or unsubstituted ether group, substituted or unsubstituted ester group, any combination of the above groups, and $R^2$ includes an allyl group; and x and y are integers independently having any value from 1 to 10. Thus, either or both side chains $R^1$ and $R^2$ may have terminal unsaturation and, in particular, may include an allyl group. An unsubstituted alkyl group is a hydrocarbyl group. A substituted alkyl group may include atoms other than carbon and hydrogen, such as a halogen group or other functional groups. In some embodiments, a substituted or unsubstituted alkyl group may include from 1 to about 100 carbon atoms in the alkyl chain. In other embodiments, a substituted or unsubstituted alkyl group may have from 1 to 10 carbon atoms in the alkyl chain. Aryl group contain aromatic rings.

Particular, nonlimiting examples of suitable unsaturated diols include trimethylolpropane monoallyl ether ("TMPME"), which is commercially available, for example from Perstorp Specialty Chemicals AB; 1,3-propanediol, 2-(2-propen-1-yl)-2-[(2-propen-1-yloxy)methyl]; 1,3-propanediol, 2-methyl-2-[(2-propen-1-yloxy)methyl]; 1,3-propanediol, 2,2-bis[(2-propen-1-yloxy)methyl]; and 1,3-propanediol, 2-[(2,3-dibromopropoxy)methyl]-2-[(2-propen-1-yloxy)methyl]. The ethylenically unsaturated elastomeric polyurethane is prepared by reacting the unsaturated diol, at least one diisocyanate, at least one polymeric polyol, and optionally at least one nonpolymeric reactant with two or more isocyanate-reactive groups (an "extender") that typically has a molecular weight of less than about 450.

The amount of unsaturated diol monomer units in the thermoplastic polyurethane or polyurethane elastomer may generally be from about 0.1 wt. % to about 25 wt. %. In particular embodiments, the amount of unsaturated diol monomer units in the thermoplastic polyurethane or polyurethane elastomer may be about 10 wt. %. The ethylenically unsaturated groups crosslink when free radicals are generated during curing of the core or core layer.

Ethylenic unsaturation may also be introduced after the polyurethane is made, for example by copolymerizing dimethylolpropionic acid then reacting the pendent carboxyl groups with glycidyl methacrylate, glycidyl acrylate, or allyl glycidyl ether.

In certain embodiments the isocyanate-functional polyurethane preferably has a melt flow rate of from about 5 g/10 min to about 100 g/10 min, determined according to ASTM D1238.

The isocyanate-functional polyurethane may be shielded from moisture until it is mixed with the thermosetting elastomer to ensure that the isocyanate groups do not react before the core is made. This shielding from moisture may take the form of environmental controls, storage in moisture proof containers (such as aluminum foil lined bags).

Compounded Core Material

In addition to the thermosetting elastomer, the crosslinker for the thermosetting elastomer, any initiator or catalyst for curing the thermosetting initiator, and the isocyanate-functional polyurethane, the core material may include other ingredients such as fillers and customary additives. Nonlimiting examples of suitable inorganic fillers include metals, zinc oxide, zinc sulfate, barium carbonate, barium sulfate, calcium oxide, calcium carbonate, clay, magnesium carbonate, tungsten, tungsten carbide, tin oxide, zinc carbonate, silica, talc, carbon black, carbon fibers, clays, glass fibers, natural fibrous minerals, and combinations of these. In some embodiments, zinc oxide may be selected for its advantageous properties. Fillers may be used to adjust the specific gravity, modulus, and other physical properties. In some embodiments, the density of a core or core layer may be from about 1.05 g/cm$^3$ to about 1.25 g/cm$^3$. Suitable organic fillers may include almond shell powder, apricot flour, bamboo flour, tree bark flour, clam shell flour, coconut shell flour, cork flour, corn cob flour, cottonseed hulls, flock flour, hazelnut shell powder, kenaf flour, natural fibers, nutshell flour, olive stone flour, peanut hulls, pecan flour, pine-nut shell powder, pistachio-nut shell powder, plant fiber, rice hull flour, rice hull grit, soy bean flour, starch flour, black walnut shell flour, English walnut shell flour, wheat chaff flour, and wood flour. Combinations of fillers can be used. The total amount of the filler may be from about 0.5 to about 30 percent by weight of the compounded material used to make the core or core layer.

Customary additives may be included, such as wetting or dispersing additives, processing aids, antioxidants like phosphites and hindered phenols and bisphenols, and hydroquinones, regrind (recycled core material), and polymeric, ceramic, metal, and glass microspheres, which may be solid or hollow, filled or unfilled.

When the thermosetting elastomer is a rubber, the core or core layer material may be compounded with other additives typically used in compounding rubber, such as peptizers like zinc pentachlorothiophenol, dibenzamido-diphenyl disulfide, phenylhydrazine, and xylyl mercaptan.

A compounded core material is prepared by mixing or blending together the thermosetting elastomer, the crosslinker for the thermosetting elastomer, any initiator or catalyst for curing the thermosetting initiator, the isocyanate-functional polyurethane, and any filler and additives in mixing equipment such as an extruder (single- or twin-screw), a Banbury mixer, an internal mixer, or a ribbon mixer.

In the embodiments of rubber elastomers, the uncured rubber, crosslinker, free-radical initiator, the isocyanate-functional polyurethane, any filler, and any additives are mixed together, then the compounded material is formed into a core or core layer and cured. In the embodiments of thermoplastic elastomers having crosslinkable groups, the thermoplastic elastomers having crosslinkable groups, a crosslinker for the crosslinkable groups, optionally a catalyst for the crosslinking reaction, the isocyanate-functional polyurethane, a free-radical initiator if desired when the isocyanate-functional polyurethane contains ethylenic unsaturation, any filler, and any additives are mixed together, then the compounded material is formed into a core, core center, or core layer and cured.

The thermosetting polymer and the isocyanate-functional polyurethane may generally be mixed in any proportions. For example, the weight ratio of the isocyanate-functional polyurethane may be at least about 1% by weight, or at least about 5% by weight, or at least about 10% by weight, or at least about 25% by weight, or at least about 50% by weight, or at least about 75% by weight, or at least about 90% by weight, or at least about 95% by weight, or at least about 99% by weight based on total polymer weight. In various embodiments, the weight ratio of the isocyanate-functional polyurethane may be within a range of from about 1% by weight to about 99% by weight, or from about 5% by weight to about 95% by weight, or from about 10% by weight to about 90% by weight, or from about 20% by weight to about 80% by weight, or from about 30% by weight to about 70% by weight, or from about 40% by weight to about 60% by weight based on total polymer weight.

In various preferred embodiments, the compounded core material contains from about 0.01 or about 0.05 or about 0.1 weight percent to about 1 or about 2 or about 3 or about 4 or about 5 weight percent isocyanate groups (—NCO) based on the total weight of the compounded core material. The content of isocyanate groups may be determined by FTIR from the NCO stretch band between 2200 cm$^{-1}$ and 2300 cm$^{-1}$ (generally 2250 cm$^{-1}$ and 2270 cm$^{-1}$) by comparison of the peak area against standards made with known amounts of isocyanate groups. Alternatively, the isocyanate content can be determined by titration. The method in ASTM D2572 can be used before the compounded core material is cured. After the compounded core material is cured, the cured material may be finely group (325 mesh or finer) and titrated by reaction of the free isocyanate with an amine, then back-titration of the unreacted amine. A suitable procedure for this is to accurately weight approximately 5 g of the finely ground cured core material; add 20 ml of dibutylamine solution (338 g of dibutylamine diluted with dry toluene to 1000 ml.). Dilute with 50 ml of dry tetrahydrofuran (THF). Stir until homogenously and add 100 ml of anhydrous isopropanol. (IPA). Add 0.5 ml of a bromophenol blue indicator (0.1 g bromophenol blue add 1.5 ml of 1 N sodium hydroxide and dilute to 1000 ml with distilled water) and titrate with 1.0 N hydrochloric acid (HCl). The endpoint is yellow. A blank in which all the materials are charged except the sample is titrated. Percent NCO is calculated as 4.2×[(ml HCl blank)− (ml HCl sample)]/sample weight Core, Core Center, or Core Layer in the Golf Ball The compounded material is then formed into the core of a unitary core or at least one of the core center or a core layer of a multi-layer core and then cured.

The golf ball containing the core or core layer with the thermoset elastomer and isocyanate-functional polyurethane may generally be of any construction conventionally used for golf balls, such as a regulation or non-regulation construction. Regulation golf balls are golf balls which meet the Rules of Golf as approved by the United States Golf Association (USGA). Golf balls discussed herein may also be made of any of the various materials known to be used in golf ball manufacturing, except as otherwise noted.

FIG. 1 shows a golf ball 100 that is a two-piece golf ball with a cover 110 substantially surrounding a core 120. In golf ball 100, core 120 contains the thermoset elastomer and isocyanate-functional polyurethane.

FIG. 2 shows a golf ball 200 that includes a core 230, an inner cover layer 220 substantially surrounding core 230, and an outer cover layer 210 substantially surrounding inner cover 220. In golf ball 200, core 230 contains the thermoset elastomer and isocyanate-functional polyurethane.

FIG. 3 shows a golf ball 300 that includes an core 330, a core layer 320 substantially surrounding core 330, and a cover 310 substantially surrounding core layer 320. At least one of core 330 and core layer 320 contains the thermoset elastomer and isocyanate-functional polyurethane, and both core 330 and core layer 320 may contain the thermoset elastomer and isocyanate-functional polyurethane.

FIG. 4 shows a four-piece golf ball 400 that includes a core 440, a core layer 430 substantially surrounding core 440, an inner cover layer 420 substantially surrounding core layer 430, and an outer cover layer 410 substantially surrounding inner cover layer 420. At least one of core 440 and core layer 430 contains the thermoset elastomer and isocyanate-functional polyurethane, and both core 440 and core layer 430 may contain the thermoset elastomer and isocyanate-functional polyurethane.

The golf ball core or core layer may be formed using a variety of techniques such as compression molding, injection molding, or thermoforming methods. For example, the core or core layer material may be compounded in a low temperature twin-screw extruder and formed into a slug that is compression molded to form the core. If a single-screw or twin-screw process is used, the dwell times of the molten reaction mixture in the screw extruder may generally be in the range of from about 0.3 to about 10 minutes, and in some embodiments may be from about 0.4 to about 4 minutes. The temperature of the screw housing may be in the range of about 70° C. to 280° C. If a batch method is used to form the thermoplastic polyurethane elastomer, all the components are molten and mixed together with a high agitated stir at a temperature in the range of about 70° C. to 120° C. for about 1 to about 3 minutes.

The golf ball may have additional core layers. In certain preferred embodiments, at least an outermost core layer contains the thermoset elastomer and isocyanate-functional polyurethane. At least one of the core and any core layers is prepared from the thermoset elastomer and the isocyanate-functional polyurethane. Any of the core and core layers not made of the thermoset elastomer and isocyanate-functional polyurethane may be prepared using other suitable materials for golf ball cores and core layers, including compounded rubbers other crosslinking elastomers prepared without the isocyanate-functional polyurethane, thermoplastic elastomers, and highly neutralized acid polymer (HNP) compositions.

Highly neutralized acid polymer compositions may be prepared by reacting a copolymer of ethylene and at least one of acrylic acid and methacrylic acid, which has from about 5 to about 14 percent by weight of the acid monomer with a metal cation in an amount sufficient to neutralize from about 65 up to 100% of the acid groups of the copolymer.

Examples of ionomer resin that may be used include copolymers of ethylene, an α,β-ethylenically unsaturated acid having 3 to 8 carbon atoms, and optionally an ester of an α,β-ethylenically unsaturated acid having 3 to 8 carbon atoms that are at least partially neutralized with a metal ion. Examples of the ethylenically unsaturated acid include acrylic acid, methacrylic acid, crotonic acid, fumaric acid, and maleic acid; in particular, acrylic acid and methacrylic acid may be preferred. Examples of the α,β-ethylenically unsaturated esters include the methyl, ethyl, propyl, isopropyl, butyl, isobutyl, tert-butyl, amyl, and hexyl esters of acrylic acid, methacrylic acid, crotonic acid, fumaric acid, and maleic acid; in particular, acrylates and methacrylates are useful. The copolymer may have from about 5 to about 14 percent by weight of the acid monomer. In various preferred embodiments, the copolymer has from about 6 or from about 7 or from about 8 or from about 9 percent by weight up to about 10 or up to about 11 or up to about 12 or up to about 14 percent by weight of the acid comonomer. Particular preferred embodiments that may be mentioned are copolymers of ethylene and acrylic acid that have from about 6 to about 11 percent by weight of the acrylic acid monomer or from about 7 to about 11 percent by weight of the acrylic acid monomer or from about 8 to about 10.5 percent by weight of the acrylic acid monomer and copolymers of ethylene and methacrylic acid that have from about 8 to about 14 percent by weight of the methacrylic acid monomer or from about 9 to about 14 percent by weight of the methacrylic acid monomer. The neutralizing metal ion may be, for example, monovalent metal ions such as sodium, potassium, and lithium ions; divalent earth metal ions such as magnesium, calcium, zinc, and barium; and other metal ions such as aluminum, zirconium, and tin, with sodium, zinc, and magnesium ions being among those preferred.

Suitable highly neutralized acid polymer compositions may include HPF resins such as HPF1000, HPF2000, HPF AD1027, HPF AD1035, HPF AD1040 and a mixture thereof, all produced by E. I. DuPont de Nemours and Company. The highly neutralized acid polymer compositions may further include additives or fillers, such as any of those already mentioned, or melt flow modifiers. For example, the acid polymer may be neutralized to 70% or higher, including up to 100%, with a suitable cation source, particularly magnesium, sodium, zinc, or potassium. The highly neutralized acid polymer composition may have a Vicat softening temperature of from about 50° Celsius to about 60° Celsius. Suitable melt flow modifiers include, for example, fatty acids and salts thereof, polyamides, polyesters, polyacrylates, polyurethanes, polyethers, polyureas, polyhydric alcohols, and combinations of these. The highly neutralized acid polymer composition may be molded using hot-press molding or injection molding.

A blend of at least first and second highly neutralized acid polymers, each having a Vicat softening temperature and a specific gravity, may be used to form the core or a core layer in a multi-layer core ball. In such embodiments, the absolute value of the difference between the Vicat softening temperatures may be no more than about 15° C. and the absolute value of the difference between the specific gravities is no more than about 0.015. The first Vicat softening temperature may be between about 50° C. and about 60° C., and the second Vicat softening temperature may be between about 40° C. and about 60° C. A ratio of the first highly neutralized acid polymer to the second highly neutralized acid polymer may be from about 20:80 to about 80:20. The first highly neutralized acid polymer and the second highly neutralized acid polymer may be neutralized by the same cation source. Further description of golf balls with including a blend of at least first and second highly neutralized acid polymers may be found in U.S. patent application Ser. No. 13/194,064 to Hsin Cheng filed on Jul. 29, 2011, and entitled "A Golf Ball Including a Blend Of Highly Neutralized Acid Polymers And Method of Manufacture," the disclosure of which is hereby incorporated by reference.

Additionally, the core or a core layer in a multi-layer core ball may comprise a blend of a first highly neutralized acid polymer having a first Vicat softening temperature and a first specific gravity, a second highly neutralized acid polymer having a second Vicat softening temperature and a second specific gravity, and an ionomer-based masterbatch comprising an additive and an ionomer resin having a third Vicat softening temperature and a third specific gravity. The absolute values of the differences among the Vicat softening temperatures is no more than about 15° C. and the absolute values of the differences among the specific gravities are no more than about 0.015. The ionomer resin may have a third specific gravity and the additive may be a filler having a specific gravity greater than the first, second, and third specific gravities. In particular, the specific gravity of the filler may be greater than the sum of the first, second, and third specific gravities. In some embodiments, the ionomer-based masterbatch may comprise at least about 55 wt percent additive. The first Vicat softening temperature may be between about 48° C. and about 65° C., the second Vicat softening temperature may be between about 48° C. and about 65° C., and the third Vicat softening temperature may be between about 48° C. and about 65° C. Further description of golf balls including a blend of at least first and second highly neutralized acid polymers and an ionomer-based masterbatch may be found in U.S. patent application Ser. No. 13/194,094 to Chen Tai Liu et al. filed on Jul. 29, 2011, and entitled "A Golf Ball Including A Blend Of Highly Neutralized Acid Polymers And Method Of Manufacture," the disclosure of which is hereby incorporated by reference. Additional information may also be found in U.S. patent application Ser. No. 13/193,999 to Chen Tai Liu et al. filed on Jul. 29, 2011, and entitled "Method Of Manufacturing A Golf Ball Including A Blend Of Highly Neutralized Acid Polymers," the disclosure of which is hereby incorporated by reference.

An outer core 430 made from thermoset materials may be made by crosslinking a polybutadiene rubber composition. When other rubber is used in combination with a polybutadiene, it is typical that polybutadiene is included as a principal component. Specifically, a proportion of polybutadiene in the entire base rubber is preferably equal to or greater than 50% by weight, and particularly preferably equal to or greater than 80% by weight.

In embodiments where outer core 430 is made from a polybutadiene rubber composition, outer core 430 may be made by hot-press molding. Suitable vulcanization conditions include a vulcanization temperature of between 130 degrees Celsius and 190 degrees Celsius, and a vulcanization time of between 5 and 20 minutes. To obtain the desired rubber crosslinked body for use as the core in the present invention, the vulcanizing temperature is preferably at least 140 degrees Celsius.

When outer core 430 is produced by vulcanizing and curing the rubber composition in the above-described way, advantageous use may be made of a method in which the vulcanization step is divided into two stages: first, the outer core layer material is placed in an outer core layer-forming mold and subjected to initial vulcanization so as to produce a pair of semi-vulcanized hemispherical cups, following which a prefabricated inner core layer is placed in one of the hemispherical cups and is covered by the other hemispherical cup, in which state complete vulcanization is carried out.

The surface of inner core 440 placed in the hemispherical cups may be roughened before the placement to increase adhesion between inner core 440 and outer core 430. In some embodiments, the surface of inner core 440 may be pre-coated with an adhesive or pre-treated with chemical(s) before placing inner core 440 in the hemispherical cups to enhance the durability of the golf ball and enable a high rebound.

In various embodiments, outer core 430 may have a surface Shore D hardness of from 45 to 65, or from 50 to 60. Outer core layer 430 may have a thickness of from 5 millimeters to 9 millimeters, and may have a volume which is greater than any other layer of golf ball 400.

Cover

The core (unitary or multi-layer) may then be covered with a dimpled cover layer formed, for example, by injection molding, compression molding, casting, vacuum forming, injection molding, and so on.

The core may be surface treated before the cover is applied Nonlimiting examples of suitable surface preparations include mechanically or chemically abrasion, corona discharge, plasma treatment, or application of an adhesion promoter such as a silane.

For example, when the cover is formed by injection molding, a core fabricated beforehand may be set inside a mold, and the cover material may be injected into the mold. Reaction injection molding may be used to provide a thermoset cover. Alternatively, another method that may be used involves pre-molding a pair of half-covers from the cover material by die casting or another molding method, enclosing the core in the half-covers, and compression-molding at, for example, between 120° C. and 170° C. for a period of 1 to 5 minutes to attach the cover halves around the core. In another method, the cover composition may be cast about the core. The cast cover is preferably cured in a closed mold. The casting process may be performed under nitrogen. A first half of the cover may be formed in a mold over the core, then a second half of the cover assembled to the first half and cured to form a finished cover. The surface of the core may be surface-treated before the cover is formed over it to increase the adhesion between the core and the cover. The cover typically has a dimple pattern and profile to provide desirable aerodynamic characteristics to the golf ball. Typically, the cover may have a thickness of from about 0.5 mm to about 3 mm.

The cover is formed on the core (unitary or with outer layers) by injection molding, compression molding, casting, vacuum forming, powder coating, injection molding, and so on. For example, when the cover is formed by injection molding, a core fabricated beforehand may be set inside a mold, and the cover material may be injected into the mold. The cover is typically molded on the core by injection molding or compression molding. Reaction injection molding may be used to provide a thermoset cover. Alternatively, another method that may be used involves pre-molding a pair of half-covers from the cover material by die casting or another molding method, enclosing the core in the half-covers, and compression-molding at, for example, between 120° C. and 170° C. for a period of 1 to 5 minutes to attach the cover halves around the core. In another method, the cover composition may be cast about the core. The cast cover is preferably cured in a closed mold. The casting process may be performed under nitrogen. A first half of the cover may be formed in a mold over the core, then a second half of the cover assembled to the first half and cured to form a finished cover. The core may be surface-treated before the cover is formed over it to increase the adhesion between the core and the cover. Non-limiting examples of suitable surface preparations include mechanically or chemically abrasion, corona discharge, plasma treatment, or application of an adhesion promoter such as a silane. The cover typically has a dimple pattern and profile to provide desirable aerodynamic characteristics to the golf ball.

Inner cover layer 420 may comprise a thermoplastic material. The thermoplastic material of inner cover layer 420 may comprise at least one of an ionomer resin, a highly neutralized acid polymer composition, a polyamide resin, a polyurethane resin, a polyester resin, and a combination thereof. In some embodiments, inner cover layer 420 may comprise a crosslinked thermoplastic polyurethane that is similar to the thermoplastic polyurethane including unsaturated bonds describe above. For example, inner cover layer 420 may comprise a crosslinked thermoplastic polyurethane that crosslinks through radical initiation of an unsaturated bond in a chain extender of formula (1) (as describe above), but the inner cover layer material may or may not have an isocyanate index value that differs from 100.

In some embodiments, inner cover layer 420 may comprise an uncrosslinked thermoplastic polyurethane that is different in composition from outer cover layer 410, while in other embodiments, inner cover layer 420 may comprise an entirely different type of material from outer cover layer 410.

In other embodiments, inner cover layer 420 may include a resilient material. The resilient material may be comprised of a thermoplastic polyurethane material containing an isocyanate monomer and a hyper branched polyol having a hydroxyl valence of from about 2.1 to about 36, also known as a "dendritic TPU."

These dendritic thermoplastic polyurethanes may be prepared from: (A) from about 30 to about 70 parts (by weight of the total reaction mixture) of one or more bio-renewable polyether polyols; (B) from about 15 to about 60 parts (by weight of the total reaction mixture) of one or more polyisocyanates; (C) from about 0.1 to about 10 parts (by weight of the total reaction mixture) of one or more hyper branched polyols having a hydroxy valence of from an about 2.1 to about 36; and (D) from about 10 to about 40 parts (by weight of the total reaction mixture) of one or more chain extenders. Such a dendritic TPU may be prepared by a process comprising the step of: (1) mixing together, in order, optionally the one or more chain extenders, the one or more polyisocyanates, optionally the one or more other polyols, and the one or more hyper branched polyols having a hydroxy valence of from about 2.1 to about 36. This cover material may be advantageous in providing, among other attributes, increased scuff resistance. Further description of golf balls including a resilient material may be found in U.S. patent application Ser. No. 13/193,025 to Ichikawa, filed on Jul. 28, 2011 and entitled "Golf Ball Having a Resilient Material," the disclosure of which is hereby incorporated by reference.

Golf Ball Physical Properties

In various embodiments, inner core 440 may have certain physical properties that may be advantageous to golf ball 400. A diameter of inner core 440 may be in a range of about 19 millimeters to about 32 millimeters, or in a range of about 19 millimeters to about 30 millimeters, or in a range of about 21 millimeters to about 30 millimeters, or in a range of about 21 millimeters to about 28 millimeters, or in a range of about 24 millimeters to about 28 millimeters Inner core 440 may have a surface Shore D hardness of 40 to 60, or of 45 to 55.

Inner core 440 may have a Shore D cross-sectional hardness of from 45 to 55 at any single point on a cross-section obtained by cutting inner core layer 440 in half. Inner core 440 may also have a Shore D cross-sectional hardness difference between any two points on the cross-section of within ±6. By controlling the Shore D hardness difference of inner core 440, golf ball 400's overall performance may be stabilized. In order to achieve a lower ball spin rate, in some embodiments, inner core 440 may have a compression deformation of from about 3 millimeters to 5 millimeters under loads of 10 kg and 130 kg.

Inner core 440 may also have a COR value from 0.785 to 0.9, or from 0.795 to 0.89, or from 0.8 to 0.88 Inner core 440 may have a first coefficient of restitution, where golf ball 400 has a second coefficient of restitution, and the first coefficient of restitution is higher than the second coefficient of restitution by at least 0.01. Golf ball 400 may have a coefficient of restitution of at least 0.775.

Inner cover layer 420 may have a thickness of less than 2 millimeters. In some embodiments, inner cover layer 420 may have a thickness of less than 1.5 millimeters. In some embodiments, inner cover layer 420 may have a thickness of less than 1 millimeter. Although inner cover layer 420 may be relatively thin compared to the rest of the layers of golf ball 400, inner cover layer 420 may have the highest surface Shore D hardness among all layers. In some embodiments, inner cover layer 420 may have a Shore D hardness of from about 60 to about 70 as measured on the curved surface. Also, inner cover layer 420 may have a high flexural modulus of from 60,000 psi to 100,000 psi, or from 70,000 psi to 85,000 psi. In some embodiments, the density of inner cover layer 420 may be from about 1.05 g/cm$^3$ to about 1.5 g/cm$^3$ to create a greater moment of inertia.

Outer cover layer 410 may comprise a crosslinked thermoplastic polyurethane, as discussed above with respect to the thermoplastic polyurethane in the mixture of the core. For example, outer cover layer 410 may comprise a crosslinked thermoplastic polyurethane that crosslinks through radical initiation of a unsaturated bond in a chain extender of formula (1) (as describe above), but the outer cover layer material may or may not have an isocyanate index value that differs from 100.

Outer cover layer 410 may also have certain advantageous physical properties. For example, outer cover layer 410 may have desired hardness value. Specifically, in some embodiments, outer cover layer 410 may have a material Shore D hardness (measured on a slab) of from 30 to 45 and a ball surface Shore D hardness of from about 40 to about 65, or a ball surface Shore D hardness of from about 45 to about 60.

In some embodiments, outer cover layer 410 comprised of the crosslinked thermoplastic polyurethane may also have a desired flexural modulus value. Values of the flexural modulus are determined according to ASTM D790, for example by ASTM D790-10B. The value of the flexural modulus of the cover or outer cover layer may be from about 200 psi to about 10,000 psi. In some embodiments, the flexural modulus may have a value from about 200 psi to about 7,000 psi, or from about 200 psi to about 5,000 psi, or from about 200 psi to about 4,000 psi, or from about 200 psi to about 2,000 psi, or from about 300 psi to about 5,000 psi, or from about 400 psi to about 2,000 psi. In yet other embodiments, the flexural modulus may have a value of from about 200 psi to about 1,000 psi. Finally, the flexural modulus may have a value of about 500 psi in some embodiments.

Outer cover layer 410, and other layers of the golf ball, may also be configured to have certain flexural modulus and hardness values in order that the golf ball may achieve certain play characteristics. For example, a golf ball may respond and feel differently when encountered in a first instance than when encountered in a second instance. This may be accomplished by providing a layered article, where each of the layers has specific material and mechanical properties relative to the other layers. Namely, the ball is provided to have a first feel and response (distance and accuracy) when hit with a driver and a second feel and response (feel and spinnability) when hit with an iron or wedge. For example, the golf ball may be provided with various thermoplastic and thermoset layers. The flexural modulus of each thermoplastic layer may be chosen so that the highest flexural modulus is positioned proximate the surface, though the surface layer has a relatively low flexural modulus. Also, the core, whether single or multi-layer, may have a coefficient of restitution (COR) higher than that of the ball as a whole.

In one embodiment, a golf ball with layers having certain flexural modulus and hardness values may comprise a first layer, which may be an inner core layer. The first layer may have a first flexural modulus. A second layer may be an outer core layer and may be radially outward of the first layer. A third layer may be an inner cover layer. The third layer may be radially outward of the second layer and may have a second flexural modulus. A fourth layer may be an outer cover layer. The fourth layer may be radially outward of the third layer and may have a third flexural modulus. The second flexural modulus may be greater than the first flexural modulus. The first flexural modulus may be greater than the third flexural modulus.

The second flexural modulus may be at least three times the first flexural modulus. The first layer may have a first coefficient of restitution and the ball may have a second coefficient of restitution and the first coefficient of restitution may be greater than the second coefficient of restitution. A mantle layer may be positioned between the first layer and the fourth layer.

In another embodiment, a ball with layers having certain flexural modulus and hardness values may comprise a first layer, which may be an inner core layer. The first layer may have a first hardness. A second layer may be an outer core layer and may be radially outward of the first layer. The second layer may have a second hardness. A third layer may be an inner cover layer. The third layer may be radially outward of the second layer and may have a third hardness. A fourth layer may be an outer cover layer. The fourth layer may be radially outward of the third layer and may have a fourth hardness. The third hardness may be greater than the first hardness. The third hardness may be greater than the second hardness. The third hardness may be greater than the fourth hardness by at least 10 Shore D.

The first layer may have a first coefficient of restitution and the ball may have a second coefficient of restitution and the first coefficient of restitution may be greater than the second coefficient of restitution. A mantle layer may be positioned between the first layer and the fourth layer.

Further description of golf balls with layers having certain flexural modulus and hardness values may be found in U.S. patent application Ser. No. 12/860,785 to Chen-Tai Liu filed on Aug. 20, 2010, and entitled "Golf Ball Having Layers with Specified Moduli and Hardnesses," the disclosure of which is hereby incorporated by reference.

Additionally, a golf ball in accordance with this disclosure may have certain relationships among the density values of its various layers. For example, a golf ball in accordance with this disclosure may comprise: an inner core, an outer core surrounding the inner core, an inner cover layer substantially surrounding the outer core, and an outer cover layer substantially surrounding the inner cover layer. The inner core may have a first density value, the outer core may have a second density value, the inner cover layer may have a third density value, and the outer cover layer may have a fourth density value. The sum of the first density value and the second density value may be at least about 2 $g/cm^3$. The sum of the third density value and the fourth density value may be at least about 2.2 $g/cm^3$. Finally, the sum of the third density value and the fourth density value may be at least about 0.1 $g/cm^3$ greater than the sum of the first density value and the second density value. The first density may be from about 0.85 $g/cm^3$ to about 1.1 $g/cm^3$, the second density may be from about 1.05 $g/cm^3$ to about 1.25 $g/cm^3$, the third density may be from about 1.05 $g/cm^3$ to about 1.5 $g/cm^3$, and the fourth density may be from about 1 $g/cm^3$ to about 1.8 $g/cm^3$.

The inner core may have a first density value, and diameter of from about 21 mm to about 30 mm. The outer core may have a second density value. The inner cover layer may have a third density value, and thickness of from about 0.5 mm to about 1.2 mm. The outer cover layer may have a fourth density value, and a thickness of from about 0.6 mm to about 2 mm, wherein the thickness of the outer cover layer may be equal to or greater than the thickness of the inner cover layer. The sum of the first density value and the second density value may be at least about 2 $g/cm^3$, the sum of the third density value and the fourth density value may be at least about 2.2 $g/cm^3$, and the sum of the third density value and the fourth density value may be at least about 0.1 $g/cm^3$ greater than the sum of the first density value and the second density value.

The inner core may have a first Shore D hardness value, the outer core may have a second Shore D hardness value, the inner cover layer may have a third Shore D hardness value, the outer cover layer may have a fourth Shore D hardness value.

The third Shore D hardness value may be greater than each of the first Shore D hardness value, the second Shore D hardness value, and the fourth Shore D hardness value. The third Shore D hardness value may be at least about 10 Shore D units greater than the fourth Shore D hardness value. Also, the golf ball may have a moment of inertia of from about 82 g-cm$^2$ to about 90 g-cm$^2$, and a total diameter of about 1.680 inches.

Further description of golf balls with layers having certain relationships among the density values of its various layers may be found in U.S. patent application Ser. No. 13/250,305 to Che-Ching Lin et al. filed on Sep. 30, 2011, and entitled "Golf Ball Having Relationships Among the Densities of Various Layers," the disclosure of which is hereby incorporated by reference.

Finally, after outer cover layer 410 of golf ball 400 has been molded, golf ball 400 may undergo various conventional finishing processes such as buffing, stamping and painting. The finished golf ball 400 may have a compression deformation of 2 to 4 millimeters under a load of 10 to 130 kilograms.

While various embodiments of the invention have been described, the description is intended to be exemplary, rather than limiting and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

Golf balls made in accordance with this invention can be of any size, although the USGA requires that golf balls used in competition have a diameter of at least 1.68 inches and a weight of no greater than 1.62 ounces. For play outside of USGA competition, the golf balls can have smaller diameters and be heavier.

EXAMPLES

Core examples 1-9 are prepared by compounding the materials as shown in the following table with thorough mixing in a Banbury mixer. The compounded core materials are then formed into slugs and compression molded into unitary golf ball cores, then a cover is applied to make a finished golf ball.

| Material | 1 | 2 | 3 | 4 | 5 | 6 | 7 | 8 | 9 |
|---|---|---|---|---|---|---|---|---|---|
| High-cis 1,4-polybutadiene rubber | 100 | 100 | 100 | 100 | 100 | 100 | 100 | 100 | 100 |
| ZnO | 5 | 5 | 5 | 5 | 5 | 5 | 5 | 5 | 5 |
| zinc diacrylate | 15 | 15 | 15 | 15 | 15 | 15 | 15 | 15 | 15 |
| Antioxidant | 0.05 | 0.05 | 0.05 | 0.05 | 0.05 | 0.05 | 0.05 | 0.05 | 0.05 |
| Peroxide[1] | 0.2 | 0.2 | 0.2 | 0.2 | 0.2 | 0.2 | 0.2 | 0.2 | 0.2 |
| High index unsaturated TPU A | 100 | 50 | 25 | 10 | | | | | |
| High index unsaturated TPU B | | | | | 100 | 50 | 25 | 10 | |

[1]Luperox 231XL40, available from Arkema Inc., Philadelphia, PA

The high index unsaturated TPU A has the following formulation:

| 1.25 index TPU | |
|---|---|
| PTMEG 1000[2] | 100 |
| 1,4-butanediol | 10 |
| Poly bd ® R20LM[3] | 10 |
| diphenylmetharte diisocyanate (MDI) | 69 |
| | 189 |

[2]Terathane ® PTMEG1000 (available from INVISTA S.à r.l. Wichita, KS
[3]Poly bd ® R20LM available from. Cray ValleyUSA, Exton, PA..

The high index unsaturated TPU B has the following formulation:

| 1.30 index TPU | |
|---|---|
| PTMEG 1000[2] | 100 |
| 1,4-butanediol | 10 |
| Poly bd ® R20LM[3] | 10 |
| diphenylmethane diisocyanate (MDI) | 71.5 |
| | 191.5 |

The foregoing description of the embodiments has been provided for purposes of illustration and description. It is not intended to be exhaustive or to limit the invention. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the invention, and all such modifications are intended to be included within the scope of the invention.

What is claimed is:

1. A golf ball comprising a core comprising a thermoset elastomer and an isocyanate-functional polyurethane prepared by combining a thermosetting elastomer and an isocyanate-functional polyurethane, then curing the thermosetting elastomer, wherein the isocyanate-functional polyurethane is prepared by polymerization of a reaction mixture having an isocyanate index of at least 1.08.

2. A golf ball according to claim 1, wherein the core is a multilayer core comprising a core center and a core layer.

3. A golf ball according to claim 2, wherein the core center comprises the thermoset elastomer and isocyanate-functional polyurethane.

4. A golf ball according to claim 3, wherein the core layer comprises a polybutadiene rubber.

5. A golf ball according to claim 2, wherein the core layer comprises the thermoset elastomer and isocyanate-functional polyurethane.

6. A golf ball according to claim 5, wherein the core center comprises a copolymer of ethylene and at least one of acrylic acid and methacrylic acid that is at least about 70% neutralized with a metal cation.

7. A golf ball according to claim 1, wherein the isocyanate-functional polyurethane is an elastomer.

8. A golf ball according to claim 1, wherein the thermoset elastomer is a rubber.

9. A golf ball according to claim 8, wherein the isocyanate-functional polyurethane combined with the thermoset elastomer has an ethylenically unsaturated group and wherein the rubber is cured using a free-radical initiator.

10. A golf ball according to claim 9, wherein the ethylenically unsaturated group is provided by copolymerization of a monomer having a structure

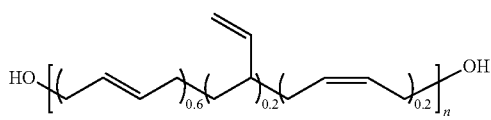

wherein n is an integer of from about 5 to about 20.

11. A golf ball according to claim 1, wherein the isocyanate-functional polyurethane is at least about 1% by weight of the combined weights of the thermoset elastomer and the isocyanate-functional polyurethane.

12. A golf ball according to claim 1, further comprising a cover.

13. A golf ball according to claim 1, wherein the isocyanate-functional polyurethane has a melt flow rate of from about 5 g/10 min to about 100 g/10 min.

14. A golf ball comprising a core comprising a thermoset elastomer and an isocyanate-functional polyurethane prepared by combining a thermosetting elastomer and an isocyanate-functional polyurethane, then curing the thermosetting elastomer, wherein the core is a multilayer core comprising:
    a) a core center comprising a copolymer of ethylene and at least one of acrylic acid and methacrylic acid that is at least about 70% neutralized with a metal cation; and
    b) a core layer comprising the thermoset elastomer and isocyanate-functional polyurethane.

15. A golf ball according to claim 14, wherein the isocyanate-functional polyurethane is an elastomer.

16. A golf ball according to claim 14, wherein the thermoset elastomer is a rubber.

17. A golf ball according to claim 16, wherein the isocyanate-functional polyurethane combined with the thermoset elastomer has an ethylenically unsaturated group and wherein the rubber is cured using a free-radical initiator.

18. A golf ball according to claim 9, wherein the ethylenically unsaturated group is provided by copolymerization of a monomer having a structure

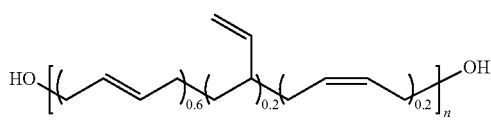

wherein n is an integer of from about 5 to about 20.

19. A golf ball according to claim 14, wherein the isocyanate-functional polyurethane is at least about 1% by weight of the combined weights of the thermoset elastomer and the isocyanate-functional polyurethane.

20. A golf ball according to claim 14, wherein the isocyanate-functional polyurethane has a melt flow rate of from about 5 g/10 min to about 100 g/10 min.

* * * * *